May 16, 1944.    S. A. BETHUNE ET AL    2,348,718
SHUTTLE CASE BEARING
Filed March 21, 1942
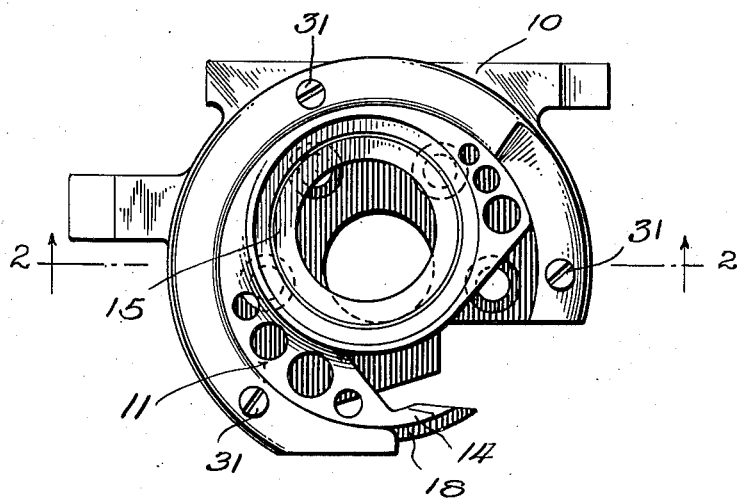
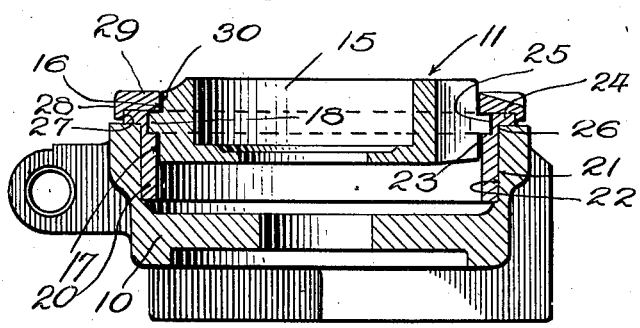
Inventors
Samuel A. Bethune
and Emmett G. Comstock
By L. F. Hammand
Attorney Patented May 16, 1944

2,348,718

UNITED STATES PATENT OFFICE 2,348,718

SHUTTLE CASE BEARING

Samuel A. Bethune, United States Army, and Emmett G. Comstock, Prince George County, Va.

Application March 21, 1942, Serial No. 435,696

3 Claims. (Cl. 112—196)

(Granted under the act of March 3, 1883, as amended April 30, 1928; 370 O. G. 757)

The invention described herein, if patented, may be manufactured and used by or for the Government for governmental purposes, without the payment to us of any royalty thereon.

The present invention relates to rotary shuttles for shoe sewing machines, and more specifically to a novel and improved raceway bearing for a rotary shuttle. This application discloses an improvement on the types of shuttle case commonly used in shoe stitching machines of the general class to which this invention relates, such as the conventional shuttle and case illustrated and described in United States Letters Patent No. 424,966.

One of the objects of the present invention is the provision of a novel and improved shuttle race bearing that is inexpensive and adapted to economical methods of manufacture, and that may be easily and quickly replaced when worn.

A further object of the invention is the provision of a shuttle race bearing separate from and detachably mounted in the shuttle case, to facilitate repair of the shuttle by the replacement of the shuttle race bearing without necessity for the removal or replacement of the shuttle case.

A further object of the invention is the provision of a shuttle race adapted to be secured in position in the shuttle case by the usual form of screws now utilized to secure a conventional shuttle cap in position on the shuttle case.

A further object of the invention is the provision of a shuttle race bearing including an annular flange adapted to register with the conventional shouldered mounting surface of the shuttle case cap so that the race bearing and shuttle cap are maintained in exact alignment at all times.

These and other desirable objects are accomplished by the improved race bearing illustrated in the drawing attached to and forming a part of the present specification, in which:

Fig. 1 is a front elevational view of a shuttle case and shuttle constructed in accordance with the teachings of the present invention.

Fig. 2 is a bottom plan sectional view, taken substantially on the plane of the line 2—2 of Fig. 1.

The shuttle case 10 provides a rotatable mounting for a conventional form of shuttle 11, which may be rotatably driven by the driving shaft and driver (not shown). The operation of this type of shuttle is entirely conventional and well known in the art and is fully described in the patent, supra, and will therefor not be described in further detail except to point out that the shuttle includes a point or beak 14, which functions as a loop-taker, to throw the needle thread loop over the thread of a bobbin (not shown) carried in the recess 15 of the shuttle.

The shuttle 11 rotates on the circular bearing surfaces 16 and 17, on the opposite sides of the retaining flange 18. The inside of the shuttle case is provided with a removable bearing consisting of a single, integral, metal sleeve having a rim 24 and bushing portion 20. The bushing portion 20 includes a cylindrical outer surface 21 adapted to be received in the cavity 22 of the shuttle case 10.

The race bearing also includes an inner cylindrical shuttle bearing surface 23 and the outwardly extending flange 24 has a notch 25 at the inside, adapted to receive and guide the flange 18 of the shuttle. The thickness of the cylindrical bearing (between the inner surface 23 and the outer surface 21) is greater than the depth of the notch 25 so that the outer race bearing may be received in the plain cylindrical recess 22 and the bearing surface 23 and flange 24 are joined by the thin section 26 adjacent the notch 25.

The outer rim 27 of the flange 24 is accurately machined in exact concentric relationship with the bearing surface 23 and notch 25 and is of exact dimensions to fit within the annular flange 28 of the conventional shuttle case cap 29. By this arrangement the cap 29 and the race bearing are positively locked together to maintain the inner bearing surface 30 of the cap and the inner bearing surface 23 in exact concentric alignment with each other to provide a perfect bearing for the shuttle 11, irrespective of minor variations in the relative positions of the race bearing with the shuttle housing. This arrangement makes it possible to allow greater tolerances in machining the shuttle case than would otherwise be practical.

The entire assembly is secured in the shuttle case 10 by a plurality of machine screws 31 and a number of dowel pins (not shown) may be inserted through the flange 24 and into the shuttle case to aid in properly locating the race bearing in the shuttle case.

Having thus described our invention, we claim:

1. In a shuttle case of the type having a flat face, cylindrical shuttle recess; and a shuttle case cap having a circular inner bearing surface and a flat mounting face having an annular locating flange around and projecting from the plane of said flat mounting face; the combination of a shuttle race bearing; said bearing consisting of a bushing portion and a rim; the bushing portion having a regular cylindrical outer surface extending from the base of the rim to the end of the bushing, an inner cylindrical surface adapted to receive a shuttle and function as a shuttle raceway, an annular notch at the front face of the bearing, said notch being adapted to receive the retaining flange of a shuttle, and having a depth less than the thickness of the bushing portion to provide a thin section of the bearing uniting the bushing portion of the bearing with the rim; the outer surface of the rim being machined in exact concentric alignment with the inner raceway surfaces of the bushing portion and the notch and of exact dimensions to fit within the projecting annular flange of the shuttle case cap; the construction and arrangement being such that the bearing and cap interlock in exact predetermined position with each other to establish perfectly aligned bearing surfaces for the shuttle irrespective of irregularities in the alignment of the bearing and the shuttle case.

2. In a shuttle case of the type having a flat face, cylindrical shuttle recess; and a shuttle case cap having a circular inner bearing surface and a flat mounting face having an annular locating flange around and projecting from the plane of said flat mounting face; the combination of a shuttle race bearing; said bearing consisting of a bushing portion and a rim; the bushing portion extending inwardly of the case from the rim; an inner cylindrical surface adapted to receive a shuttle and function as a shuttle raceway, the outer surface of the rim being machined in exact concentric alignment with the inner raceway surfaces of the bushing portion and of exact dimensions to fit within the projecting annular flange of the shuttle case cap; the construction and arrangement being such that the bearing and cap interlock in exact predetermined position with each other to establish perfectly aligned bearing surfaces for the shuttle irrespective of irregularities in the alignment of the bearing and the shuttle case.

3. In a shuttle case of the type having a flat face, cylindrical shuttle recess; and a shuttle case cap having a circular inner bearing surface and a flat mounting face having an annular locating flange around and projecting from the plane of said flat mounting face, the combination of a shuttle race bearing; said bearing consisting of a bushing portion and a rim; the bushing portion having a regular cylindrical outer surface extending from the base of the rim to the end of the bushing, an inner cylindrical surface adapted to receive a shuttle and function as a shuttle raceway, an annular notch at the front face of the bearing, said notch being adapted to receive the retaining flange of a shuttle, and having a depth less than the thickness of the bushing portion to provide a thin section of the bearing uniting the bushing portion of the bearing with the rim; the outer surface of said rim being accurately fitted within said annular flange of the shuttle case cap.

SAMUEL A. BETHUNE.
EMMETT G. COMSTOCK.